United States Patent [19]
Marissal

[11] Patent Number: 5,653,193
[45] Date of Patent: Aug. 5, 1997

[54] DEVICE FOR GROWING MOLLUSKS, IN PARTICULAR OYSTERS

[75] Inventor: Eric Marissal, St Martin de Re, France

[73] Assignee: Grainocean, St. Martin de Re, France

[21] Appl. No.: 444,048

[22] Filed: May 18, 1995

[30] Foreign Application Priority Data

May 18, 1994 [FR] France ................... 94 06157

[51] Int. Cl.⁶ .................................................. A01K 61/00
[52] U.S. Cl. ...................................... 119/240; 119/223
[58] Field of Search ........................ 119/208, 223, 119/239, 240, 241

[56] References Cited

U.S. PATENT DOCUMENTS 4,003,338  1/1977  Neff et al. ........................ 119/223
4,377,987  3/1983  Satre ................................ 119/240

FOREIGN PATENT DOCUMENTS

A2242811  10/1991  United Kingdom ............... 119/241

*Primary Examiner*—Robert P. Swiatek
*Attorney, Agent, or Firm*—Hazel & Thomas

[57] ABSTRACT

The device for growing mollusks and in particular oysters incorporates at least one element constituting a tray (30) for carrying the mollusks that is disposed within a net (24) of tubular shape and adapted to be suspended from a hawser anchored in the sea. The tray element (30) comprises on its periphery a flange (42) extending generally in a direction perpendicular to the plane of the tray. The element constituting a tray further comprises a separate clamping element (32) for clamping the net against the flange (42).

12 Claims, 4 Drawing Sheets

DEVICE FOR GROWING MOLLUSKS, IN PARTICULAR OYSTERS

BACKGROUND OF THE INVENTION

The present invention relates to a device for growing mollusks and in particular oysters out at sea.

The growing of oysters or oyster farming, such as that which has been known for a long time, consists of collecting in the natural medium the larvae coming from the laying by the parents that become fixed on supports or collectors arranged in suitable regions by the oyster farmers.

When they have reached a sufficient size, the oysters are separated from the collectors and replaced or sown in the natural medium so that they can grow therein until they reach a size suitable for their commercialization.

In order to be able to sow and harvest the oysters, for many years the oysters were sown on an oyster park, i.e. places which are uncovered at low tide.

This growing method requires many tiresome operations and has an artisanal aspect, the yield being low owing to the necessity of these many manual operations and access to the parks during only limited periods.

In some regions, the oysters are sown in places which are not uncovered at low tide and the harvesting is effected with a dredge.

Such a method does not permit a supervision of the evolution oysters.

In recent years a much more industrial method has been developed, for example as concerns the collecting of the larvae which is effected in enclosed hatching grounds. These larvae are thereafter treated and monitored in a scientific manner until they reach a size sufficient to put them back in the natural medium.

In this last stage, the oysters are no longer sown but disposed on circular trays arranged inside a net of tubular shape, the trays being vertically evenly spaced apart and thereby constituting what is conventionally termed a Japanese lantern, the assembly having the shape of such an object.

The Japanese lanterns are suspended in spaced-apart relation from a hawser anchored in deep water and provided with floats.

Such Japanese lanterns have an overall height of 5 meters and their installation requires the use of a relatively large boat provided with handling and hoisting means such as for example a crane.

Presently-known trays are circular trays having an apertured central part provided with stiffeners.

Outside the central part there extends an annular edge portion whose periphery comprises parts similar to the tip of an arrow and evenly spaced apart, connecting parts between two tips being formed by a cylindrical groove perpendicular to the plane of the tray and outwardly open between two adjacent tips for receiving a thread of the net.

Further, arranged on the radial end of each tip is a point extending downwardly in a direction perpendicular to the plane of the tray so as to be capable of radially retaining a thread of the net which is generally substantially perpendicular to the thread retained in the aforementioned groove.

The annular edge portion comprises three apertures extending in a direction perpendicular to the plane of the tray and evenly spaced apart.

The construction of a Japanese lantern with such a tray according to the prior art will now be described, which will permit explanation of the drawbacks of the tray.

In a first stage, the trays are arranged along three ropes which pass through the apertures in the annular edge portion, the trays being evenly spaced apart along the ropes by retaining means, for example knots.

The trays are stacked one on top of the other in a metal sleeve, the ropes being folded between the trays and their upper ends being fixed to a hoisting hook.

In a second stage, the tubular-shaped net is folded in the form of an accordeon around the metal sleeve, three cables being fixed at 120° to one another for example in the region of the open upper circumference of the net and connected at the aforementioned hoisting hook.

When this has been achieved, the hoisting hook is hoisted about 15 to 20 centimeters, which corresponds to the spacing between two trays when the cable parts located therebetween are taut, which causes the upper part of the net to extend above the sleeve and the upper tray. In this position, the upper tray is hooked to the interior of the net by means of points or lugs and grooves.

The operation is repeated until all of the plates are hooked to the interior of the tubular-shaped net, after which the lower end of the net is gathered under the lowest tray and provided with ballast.

Lanterns constructed in this way are hooked to a hawser adapted to be cast into the sea in the known manner, the lanterns being evenly spaced apart.

It has been found that in constructing a lantern with known trays in the manner described hereinbefore, the tray is not always horizontal since the hooking to the net is not achieved in a reliable manner.

A manual modification of the hooking may be required, which takes time and is expensive and does not always provide a sufficient horizontality so that the young oysters become heaped on a sector of the tray and cannot grow in the required manner and this considerably reduces the yield.

Further, the Japanese lanterns swing in the water under the effect of currents and, when they are too close to each other, one tray of a lantern may hook by means of its points or lugs onto the net of an adjacent lantern. In this case, the nets become torn and consequently a large amount of the product is lost in the course of growth, which again reduces the yield.

In order to avoid this last drawback, the lanterns, which have an effective height of about 3 meters, are spaced apart at least two meters on the hawser.

SUMMARY OF THE INVENTION

In order to overcome the aforementioned drawbacks, an object of the invention is to provide a device for growing mollusks comprising at least one element constituting a tray whose correct positioning is easy and takes less time and which cannot hook onto a neighbouring lantern, thereby permitting a closer arrangement of the lanterns on a hawser, i.e. a greater number of lanterns for a given length of hawser, resulting in a distinctly higher yield.

The present invention therefore provides a device for growing mollusks, in particular oysters, comprising at least one element constituting a tray for carrying said mollusks and disposed inside a net having a tubular shape and adapted to be suspended from a hawser anchored at sea, characterized in that the element constituting a tray comprises on the periphery thereof a flange generally extending in a direction perpendicular to the plane of the tray, and further comprises a separate clamping element for clamping the net against the flange.

According to other features:

the flange extends on each side of the plane of the tray, the flange extends on one side of the plane of the tray, the tray is circular and the flange has a cylindrical radially outer face, the clamping element being a flat annular element;

the tray is circular and the flange has a radial outer face defining an annular cavity, the clamping element having a shape complementary to that of said cavity;

the tray is circular and the flange has a radially outer face including a part in relief, the clamping element having a complementary shape;

the central part of the tray is apertured;

the separate element comprises a cord clamping the net in the annular cavity, end portions of the cord being interconnected by a rapid fastener received in the cavity;

the rapid fastener comprises two articulated semi-shells having, in a united active position, an outer shape complementary to that of the annular cavity and defining two parallel grooves of which one groove includes elements for immobilizing a first end portion of the cord while the other groove comprises elements which allow the second end portion of the cord to slide in the groove solely in the direction for clamping the cord in the annular cavity, the semi-shells comprising mutual latching means in the active position;

the rapid fastener comprises two articulated semi-shells having, in a united active position, an outer shape complementary to that of the annular cavity and defining two parallel grooves each comprising elements which permit the end portions of the cord to slide in the associated groove in only one direction, the directions for sliding in the two grooves being opposite to each other;

the element constituting a tray comprises an annular edge portion provided with fixing apertures for fixing on a respective rope, elements for immobilizing the rope being arranged in each of the respective apertures;

the fixing apertures have a frustoconical profile with an axis perpendicular to the tray, the immobilizing element comprising two articulated semi-shells which, in a united active position, form a frustum of a cone complementary in shape to that of the fixing apertures, the narrow end part of the semi-shells defining in the active position a flange for latching against one of the respective fixing apertures, the semi-shells defining an axial groove having a diameter adapted to the rope and provided with points for immobilizing the rope.

BRIEF DESCRIPTION OF THE DRAWINGS

The present invention will now be described, solely by way of example with reference to the accompanying drawings in which.

DETAILED DESCRIPTION OF THE PREFERRED EMBODIMENTS

Figure 1:
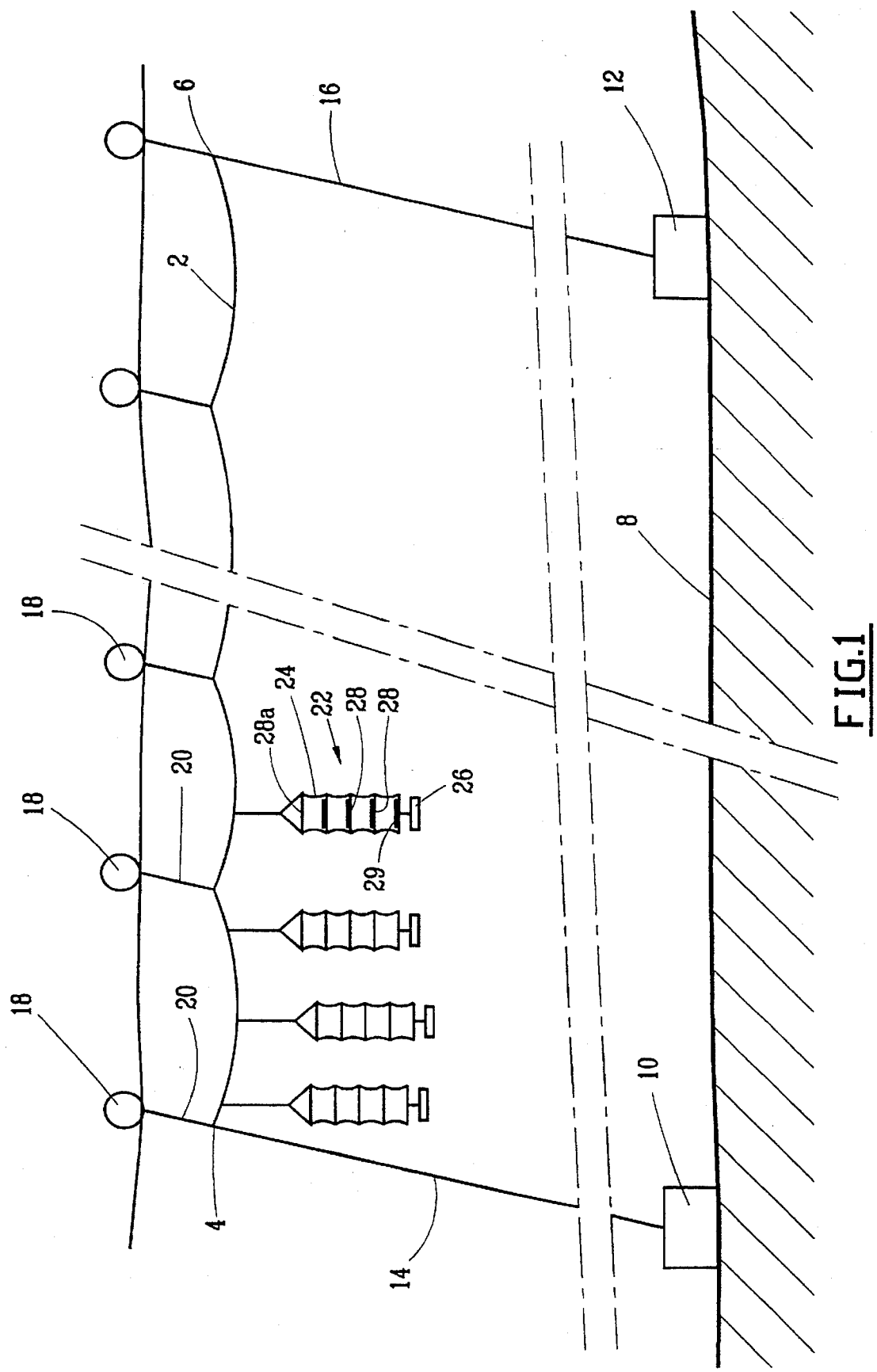
FIG. 1 diagrammatically represents a hawser anchored at sea and provided with growing devices according to the invention.

FIG. 1 is a diagrammatic view of the elements required for the growing of oysters at sea according to the present invention or the prior art.

These elements comprise a hawser 2 of which the ends 4 and 6 are anchored to the bed 8 of the sea by kentledges 10 and 12 connected by cables 14 and 16 to the ends 4 and 6 respectively.

These cables 14 and 16 have for example a length of about 30 meters.

The hawser 2 has a length of about 100 meters.

Arranged at an even spacing of about 6 meters and at the ends 4 and 6 are buoys 18 connected to the hawser 2 by cords 20 about 1 meter in length so as to maintain the hawser at a depth of about 1 meter and roughly parallel to the bed 8 of the sea.

The Japanese lanterns 22 are suspended under the hawser and evenly spaced apart along the length of the latter.

A Japanese lantern comprises a net 24 having the shape of a tube and extending roughly vertically in the absence of strong current, each net being connected in the lower part thereof to ballast 26.

Units constituting a tray 28 cooperate with the net 24 so as to constitute supports evenly spaced apart along the axis of the latter and extending in a direction perpendicular to this axis on which the oysters 29 are placed.

Note that a first tray 28a is arranged at the level of the upper open end of the net 24 and does not carry oysters.

In this design, the oysters are contained in closed spaces preventing access to predators.

As mentioned before, in the prior art, the Japanese lanterns 22 are spaced about 2 meters apart as shown in FIG. 1.

As will be clear from the following description, the use of units constituting trays according to the present invention permits arranging the Japanese lanterns with a spacing of only 1 meter without the risk of the a lantern getting its net hooked on an adjacent lantern.

A first embodiment of a unit constituting a tray according to the present invention and an alternative embodiment are shown in FIGS. 2 to 6.

Note that in all of the Figures, similar elements such as nets, the hawser, etc. apart from the unit constituting a tray according to the present invention, are designated by the same reference numeral.

Figure 4:
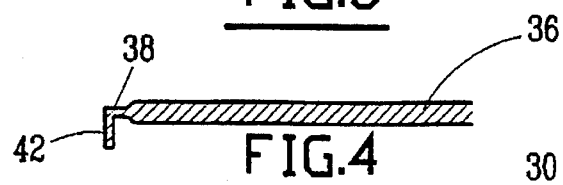
FIG. 4 is a partial sectional view of an alternative embodiment of the flange of the tray element.
Figure 5:
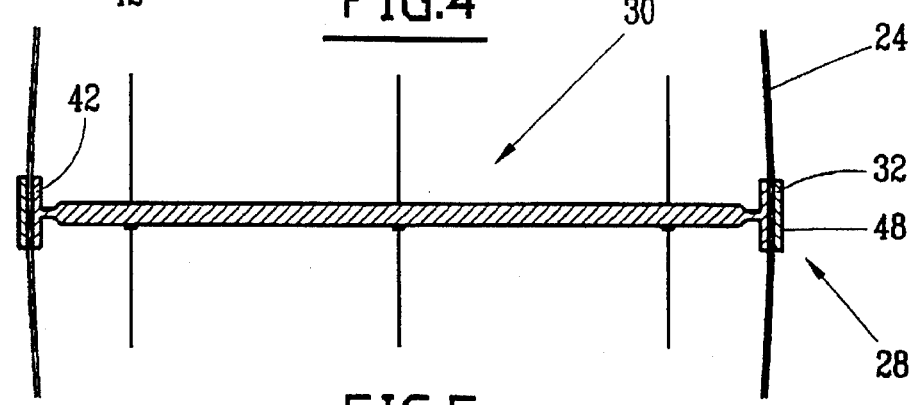
FIG. 5 is a partial sectional view of the tray element and the separate clamping element associated with the tray for cooperating in such manner as to clamp a rope therebetween.

The unit constituting a tray according to the present invention comprises an element 30 that incorporates a tray (see FIGS. 2 to 4), and a separate clamping element 32 (see FIG. 5).

Figure 2:
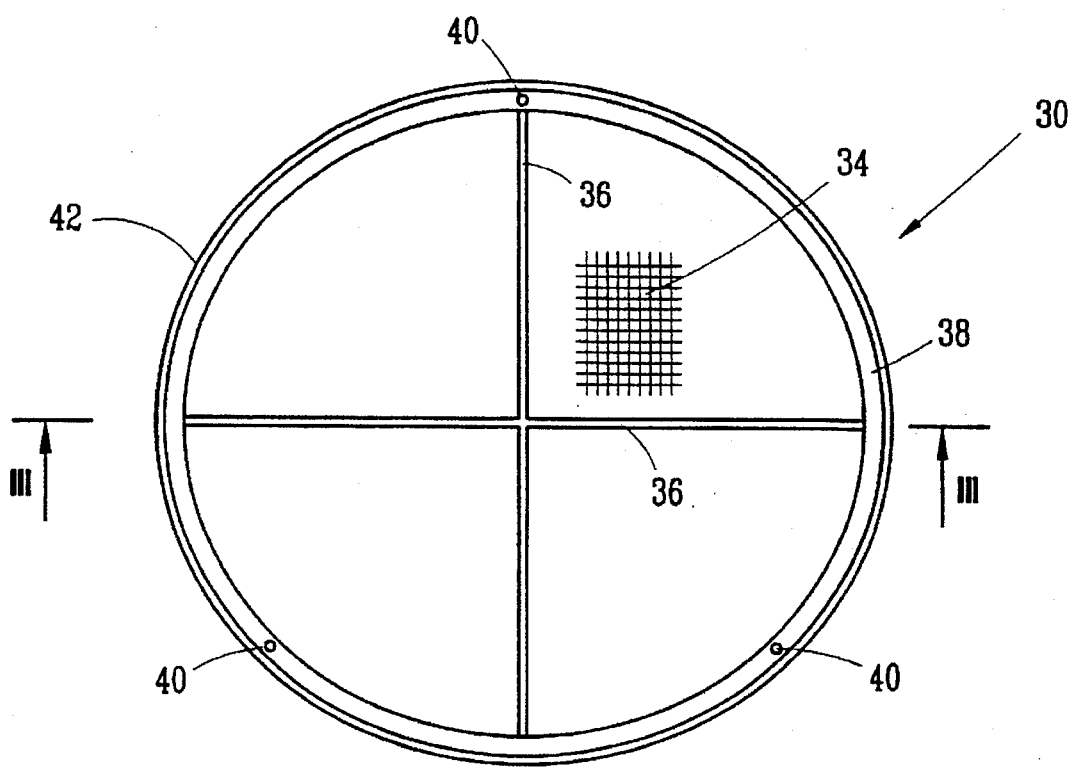
FIG. 2 is a top plan view of a first embodiment of an element constituting a tray of the device according to the invention.
Figure 3:
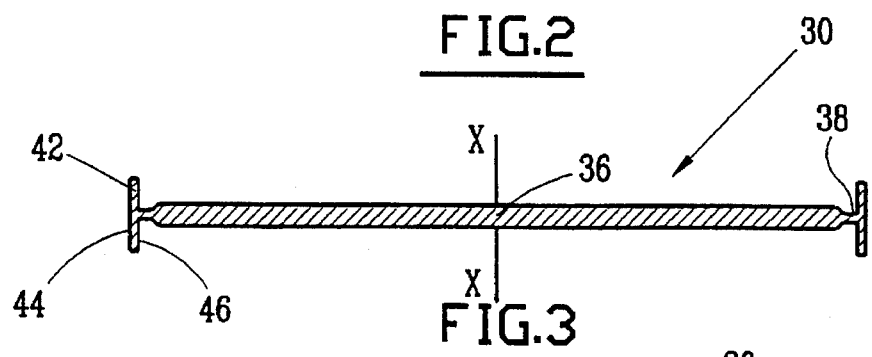
FIG. 3 is a sectional view taken on line III—III of the element constituting a tray shown in FIG. 2.

In FIG. 2, the element 30 constituting a tray according to the present invention comprises an apertured circular central part 34 having a support, partly shown in FIG. 2 and provided with thicker stiffeners 36 (see also FIG. 3).

An annular edge portion 38 extends along the periphery of the central part 34 in the general plane of the tray 30.

The annular edge portion 38 comprises three through apertures 40 angularly spaced about 120° apart around the axis X—X of the tray element 30 (see FIG. 2).

According to the present invention, arranged in the region of the radially outer periphery of the annular edge portion 38 is a flange or a rim 42 extending on each side of the general plane of the tray element 30 (see FIG. 3).

The rim 42 has a cylindrical outer face 44 having an axis X—X and an inner face 46 connected to the annular edge portion 38.

The assembly is preferably made from a moulded plastic material.

In an alternative embodiment, the rim or flange 42 may extend on only one side of the general plane of the annular edge portion 38 as shown in FIG. 4.

The plate element 30 is arranged inside the tubular-shaped net 24 in accordance with the same principles as described hereinbefore, except for the fact that, instead of being hooked by means of points, after extraction of the net and a tray from the previously-mentioned metal sleeve, the separate clamping element 32 (see FIG. 5) is arranged in confronting relation to the rim or flange 42 outside the net 24, clamps the net and maintains it in position against the outer face 44 of the rim 42.

To this end, the separate clamping element 32 in the embodiment shown in FIG. 5 comprises a flat strip of metal or plastics material provided with a device for clamping and fixing in position of a type known in the art (not shown).

In an alternative embodiment, the element 32 may be a collar of plastic material of the type for the coupling of a cable or even a simple resilient plate of suitable dimension and strength.

The radially outer face 48 of the element 32 will be substantially smooth so as to avoid hooking onto the net of an adjacent lantern out at sea. The corners of the separate clamping element 32 may be rounded so as to enhance such a feature.

This permits the use of a spacing of 1 meter between two adjacent lanterns, which increases productivity over the prior art.

Further, such an element 32 has the advantage that it can be very rapidly installed without difficulty, which is an important advantage owing to the fact that this operation is carried out on a boat subjected to the effect of waves and currents.

The rim 42 and the complementary separate clamping element 32 according to the invention may be designed in a different way.

FIGS. 6 to 12 represent alternative embodiments of the rim or flange 42 and the complementary element 32 the common feature of which is that the radially outer face of the rim 42 defines a circumferential cavity in which the complementary element 32 may be inserted for jamming or trapping the net 24 inside the cavity, the net being represented by a thin line for reasons of simplification.

Figure 6:
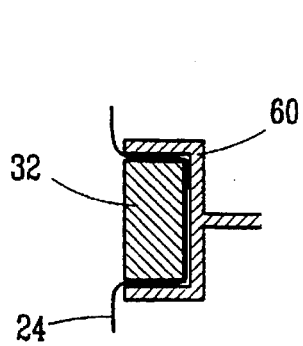
FIGS. 6 to 15 represent various alternative embodiments of the tray element and the complementary clamping element according to the invention.

In FIG. 6, the cavity 60 of the rim 42 has a rectangular shape in section in a diametrical plane of the tray and the element 32 is formed by a ring provided with known clamping means (not shown). This ring has a section complementary to the section of the cavity, i.e. a rectangular section.

Figure 7:
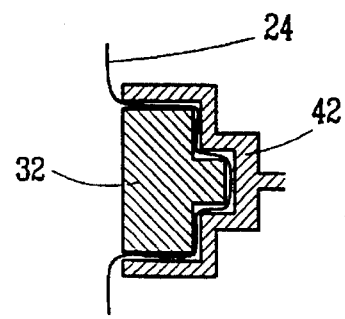

In FIG. 7, the cavity is extended toward the axis of the tray by a smaller cavity, the element 32 having a complementary adapted shape. This assembly provides a more sinuous path for the net 24.

Figure 8:
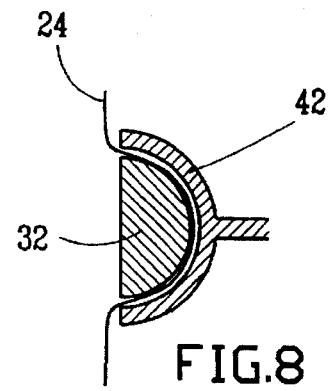

In FIG. 8, the cavity has a semi-toric shape, the element 32 having a complementary shape.

Figure 9:
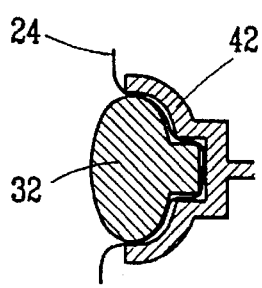

In FIG. 9, the cavity is of non-circular oval semi-toric shape and is extended by a cavity having a rectangular shape in diametrical section, the clamping element 32 having in the region of the radially inner face thereof a shape complementary to the cavity.

Figure 10:
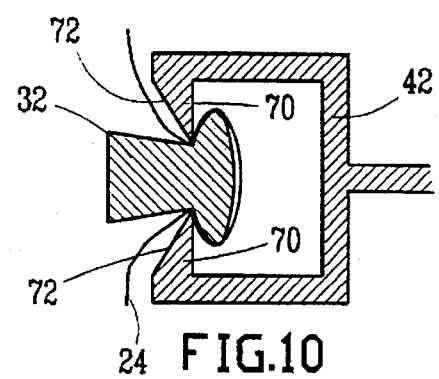

FIG. 10 represents a cavity having a rectangular diametrical section the free ends of which are provided with circumferential flanges 70 having a radially outer face which is inclined toward the interior of the cavity, the complementary clamping element 32 being made of a resilient material. The complementary element 32 comprises a radially inner part adapted to be latched in the cavity through the opening defined by the flanges 70, the radially outer part thereof being if desired conical.

Figure 11:
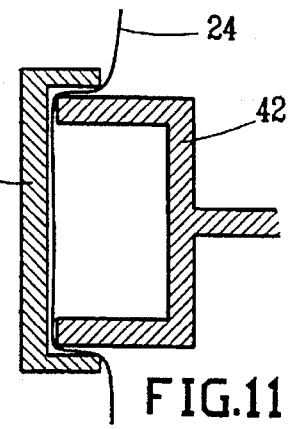
Figure 12:
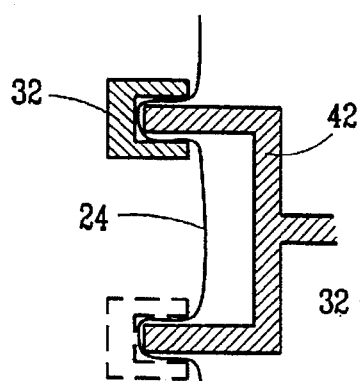

Shown in FIGS. 11 and 12 are complementary clamping elements 32 which may clamp and maintain in position the net 24 in the region respectively of the two edges or of one edge of a rectangular cavity which is open on its radially outer face.

Figure 13:
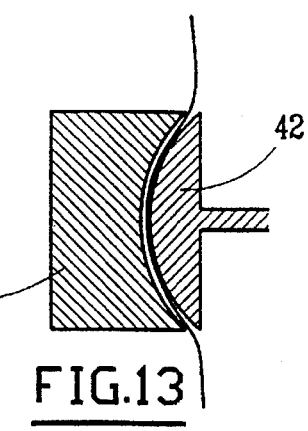
Figure 14:
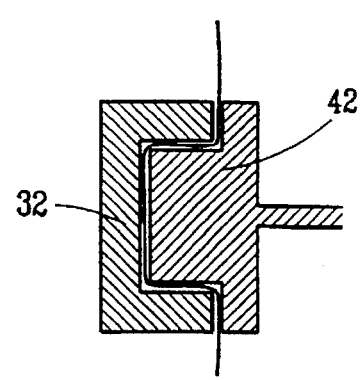

FIGS. 13 and 14 represent two alternative embodiments of the rim or flange 42 the common feature of which is that the rim 42 defines a part which projects radially outwardly, the complementary clamping element 32 having a complementary shape adapted to surround said projecting part.

In FIG. 13, the projecting part has a curved profile whereas in FIG. 14 the projecting part has a rectangular profile.

Figure 15:
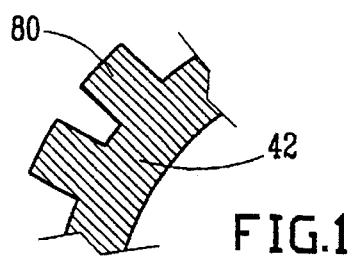

In FIG. 15, only the rim or flange 42 is shown, the latter being provided with radially outer projections constituting teeth 80 evenly spaced apart, in which case the complementary clamping element may be formed by an element of the notched belt type.

Figure 16:
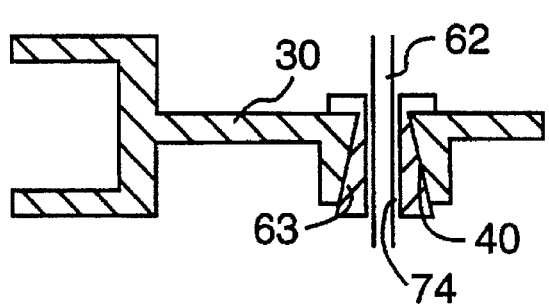
FIGS. 16 and 17 represent an element for fixing a rope in fixing apertures of the tray element.
Figure 17:
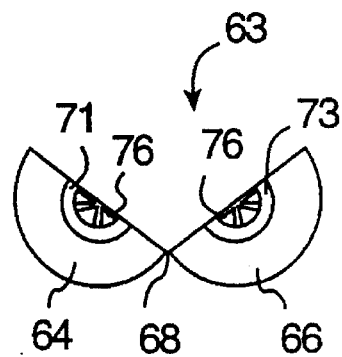

FIGS. 16 and 17 show a preferred embodiment of the fixing of an element constituting a tray 30 according to the invention on a rope 62.

In this embodiment, each of the apertures 40 of the plate element 30 has a frustoconical shape with an axis perpendicular to the general plane of the tray.

A rope 62 extending through the aperture 40 is immobilized by an immobilizing or blocking element 63.

The immobilizing element 63 comprises two semi-shells 64 and 66 articulated along a generatrix 68 (see FIG. 17).

The two semi-shells 64 and 66 have in the united position the shape of a frustum of a cone complementary to the respective frustoconical aperture 40 of the tray 30. The narrow end of the semi-shells includes a semi-flange 71 and 73 respectively which define in the assembled position a circular flange for latching against the aperture 40, as shown in FIGS. 16.

In the assembled position of the two semi-shells 64 and 66, achieved by latching means (not shown), they define a groove or bore 74 which has a diameter adapted to that of the rope 62 and is provided with points or lugs 76 adapted to immobilize the rope 62 in position.

Such an arrangement permits using indifferently either one of the sides of the tray 30 for carrying the oysters, i.e. it permits turning the Japanese lanterns over, which is a conventional practice.

Figure 18:
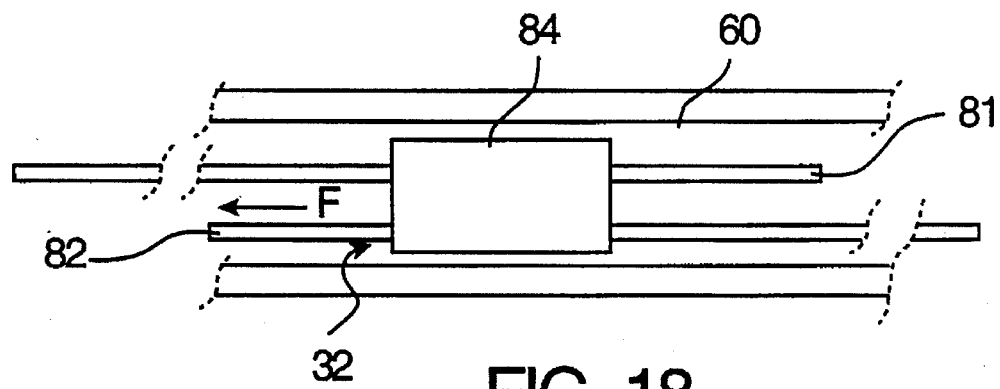
FIGS. 18 to 20 represent a manner of clamping a cord in a circumferential annular cavity of the plate element.
Figure 19:
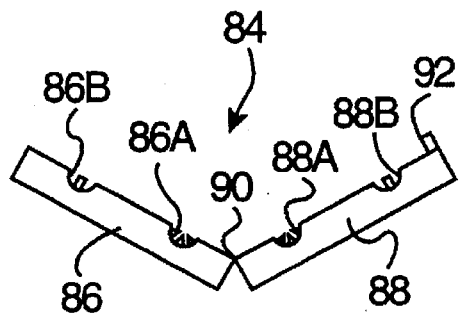
Figure 20:
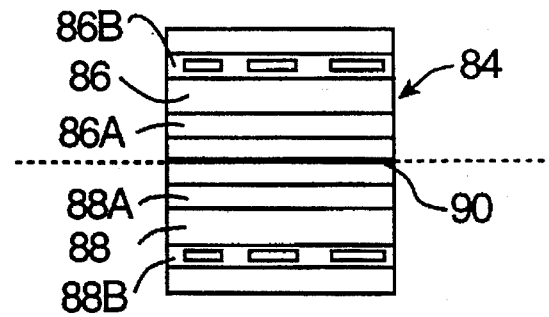

A preferred embodiment of the separate clamping element 32 is shown in FIGS. 18 to 20 and cooperates with an annular groove 60 such as that shown in FIG. 6.

The clamping element 32 is formed by a cord having a length exceeding the circumference of the tray element 30 and a first end portion 81 and a second end portion 82.

After having arranged the clamping element 32 outside and around the net surrounding the plate element 30, a rapid fastener 84 is installed in such manner as to interconnect the first and second end portions 81, 82 respectively. The rapid fastener 84, as shown in FIGS. 19 and 20, comprises two semi-shells 86, 88 of parallelepipedic shape articulated along one side 90.

The semi-shells are provided with respective latching means such as the pin 92 shown in FIG. 19 which is cooperative with a receiving recess (not shown) in the semi-shell 86.

Each semi-shell comprises respective semi-circular grooves 86A, 86B, 88A, 88B.

The semi-circular grooves 86A and 88A cooperate and define a circular groove in the united or active position of the semi-shells 86 and 88.

Likewise, the semi-circular grooves 86B and 88B define in the active position a circular groove.

Arranged in the semi-circular grooves 86A and 88A are immobilizing points or lugs which are adapted in the active position to penetrate for example the first end portion 81 of the cord 32 to immobilize the latter in position.

The grooves 86B and 88B have conventional prongs which are arranged in such manner that, in the active position, the second end portion 82 of the clamping element 32 is slidable inside the groove formed by the semi-circular grooves 86B and 88B solely in the direction for clamping the clamping element 32 in the annular groove 60, as shown by the arrow F in FIG. 18, while this second end portion 82 is prevented from sliding in the opposite direction.

For installing the clamping element 32, the latter is made to loosely surround the net so that the first end portion 81 and the second end portion 82 overlap. The rapid fastener 84 is then placed in position in such manner that the first end portion 81 is located in one of the semi-circular grooves 86A or 88A and the second end portion 82 of the cord is arranged in the associated semi-circular groove 86B or 88B, and then the two semi-shells are united in the active position.

Thereafter, by pulling on the second end portion 82 of the cord, the diameter of the circle formed by the latter is reduced until the cord enters the annular groove 60 and the traction is continued until the rapid fastener 84 is also located in the annular groove 60 and the clamping force exerted by the cord 32 is sufficient.

In an alternative embodiment (not shown), the semi-circular grooves 86A and 88A and the semi-circular grooves 86B and 88B all include immobilizing tabs or tongues which are so arranged that, in the active position, the cord is capable of sliding in two opposite directions, in solely one sense, in the grooves formed by the semi-circular grooves 86A, 88A and 86B, 88B respectively.

In such a case, after the positioning of the cord outside the net and around the annular cavity 60, it is sufficient to place the end portions of the cord in the grooves of the fastener, render the fastener active and pull in opposite directions on the two end portions of the cord.

Although various alternative embodiments of the unit constituting a tray according to the present invention have been shown, one skilled in the art would be capable with the aid of the foregoing description of modifying these elements without departing from the scope of the invention.

The invention therefore provides a unit constituting a tray for a Japanese lantern comprising an element that incorporates a tray arranged inside the net and a separate net clamping element arranged outside the net and around the flange of the element constituting the tray.

This unit permits an easy positioning of the element constituting the tray in a horizontal position and clamping the net in position on the periphery of the element constituting the tray.

As the separate clamping element has a substantially smooth outer surface, it does not hook onto the net of an adjacent lantern and the lanterns may be arranged closer together than in the prior art, which increases the yield.

Modifications may be made by one skilled in the art without departing from the scope of the invention. For example, the element constituting the tray may be constructed in the form of a plurality of elements, for example angular sectors.

What is claimed is:

1. Device for growing mollusks, in particular oysters, comprising in combination: at least one tray for carrying said mollusks, a tubular-shaped net for suspension from a hawser anchored at sea and surrounding said at least one tray, said at least one tray comprising on an outer periphery thereof a flange generally extending in a direction perpendicular to the plane of said at least one tray, and a separate clamping element arranged in confronting relation to said flange outside said net and cooperative with said flange for clamping said net against said flange.

2. Device according to claim 1, wherein said flange extends on each side of said plane of said at least one tray.

3. Device according to claim 1, wherein said flange extends on one side of said plane of said at least one tray.

4. Device according to claim 1, wherein said at least one tray is circular and said flange has a cylindrical radially outer face and said clamping element is a flat annular element.

5. Device according to claim 1, wherein said at least one tray is circular and said flange has a radially outer face defining an annular cavity, said clamping element having a shape complementary to the shape of said cavity.

6. Device according to claim 5, wherein said clamping element comprises a cord for clamping said net in said annular cavity, said cord having end portions, and a rapid fastener received in said annular cavity interconnecting end portions of said cord.

7. Device according to claim 6, wherein said rapid fastener comprises two articulated semi-shells having in a united active position thereof an outer shape complementary to the shape of said annular cavity and defining two parallel grooves, a first groove of said grooves including elements for immobilizing a first end portion of said end portions of said cord, and a second groove of said grooves comprising elements which allow a second end portion of said end portions of said cord to slide in said second groove solely in a direction for clamping said cord in said annular cavity, said semi-shells comprising mutual latching means for holding said semi-shells in said active position.

8. Device according to claim 6, Wherein said rapid fastener comprises two articulated semi-shells having in a united active position thereof an outer shape complementary to the shape of said annular cavity and defining two parallel grooves each comprising elements permitting said end portions of said cord to slide in the respective groove in solely one direction, the directions of said sliding in said two grooves being opposite to each other.

9. Device according to claim 1, wherein said at least one tray is circular and said flange has a radially outer face including a part in relief, said clamping element having a complementary shape.

10. Device according to claim 1, wherein said at least one tray has an apertured central part.

11. Device according to claim 1, wherein said at least one tray comprises an annular edge portion provided with fixing apertures for fixing on a respective rope, and means provided in each of said fixing apertures for immobilizing the respective rope.

12. Device according to claim 11, wherein said fixing apertures have a frustoconical profile with an axis perpendicular to said plane of said at least one tray, said immobilizing means provided in each of said fixing apertures comprising two articulated semi-shells which form, in a united active position thereof, a frustum of a cone complementary in shape to the shape of the respective fixing aperture, said united semi-shells defining in said active position a flange for latching against a part of said annular edge portion defining the respective fixing aperture, said semi-shells defining an axial groove having a diameter adapted to the diameter of the respective rope and provided with points for immobilizing said respective rope.

* * * * *